United States Patent
Allen et al.

(10) Patent No.: US 6,671,525 B2
(45) Date of Patent: Dec. 30, 2003

(54) BEACON ASSISTED HYBRID ASYNCHRONOUS WIRELESS COMMUNICATIONS PROTOCOL

(75) Inventors: Vernon Anthony Allen, Fort Lauderdale, FL (US); Stephen Korfhage, Davie, FL (US); Robert J. O'Dea, Fort Lauderdale, FL (US); Ralph D'Souza, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 2 days.

(21) Appl. No.: 10/022,964

(22) Filed: Dec. 13, 2001

(65) Prior Publication Data

US 2003/0114204 A1 Jun. 19, 2003

(51) Int. Cl.⁷ .............................. H04B 1/38; H04M 1/00
(52) U.S. Cl. .................. 455/574; 455/573; 455/343; 455/522; 455/403; 370/338; 370/310; 370/311; 370/312
(58) Field of Search .................. 455/574, 573, 455/343, 522, 403; 370/338, 310, 311, 337, 312

(56) References Cited

U.S. PATENT DOCUMENTS

| | | | |
|---|---|---|---|
| 4,794,649 A | | 12/1988 | Fujiwara ........................ 455/9 |
| 5,128,938 A | * | 7/1992 | Borras ........................ 370/311 |
| 5,241,542 A | * | 8/1993 | Natarajan et al. ........... 370/311 |
| 5,329,531 A | * | 7/1994 | Diepstraten et al. ........ 370/347 |
| 5,584,048 A | | 12/1996 | Wieczorek .................. 455/38.3 |
| 5,991,635 A | | 11/1999 | Dent et al. .................. 455/517 |
| 6,018,642 A | * | 1/2000 | Adachi ....................... 340/7.33 |
| 6,058,289 A | * | 5/2000 | Gardner et al. ............ 340/7.32 |
| 6,192,230 B1 | * | 2/2001 | van Bokhorst et al. .. 455/343.3 |
| 6,480,476 B1 | * | 11/2002 | Willars ........................ 370/311 |
| 6,522,873 B1 | * | 2/2003 | Moles et al. ............. 455/343.1 |
| 6,564,074 B2 | * | 5/2003 | Romans ....................... 455/574 |

* cited by examiner

Primary Examiner—Vivian Chin
Assistant Examiner—Marceau Milord
(74) Attorney, Agent, or Firm—Posz & Bethards, PLC; Charles W. Bethards

(57) ABSTRACT

A beacon assisted asynchronous method of wireless communication according to the present invention enables initiating and target devices (12, 14) to remain in sleep mode most of the time and to periodically wake up to asynchronously, and directly, communicate with one another. Specifically, each of the initiating and target devices (12, 14) transmits a beacon while operating in a default transmit/receive mode (40, 40a, 42, 42a) and subsequently listens for a response. Alternatively, the initiating device (12) may enter a data packet message mode to receive a beacon from the target device (14) and to subsequently transmit a data packet message to the target device (14) after receiving the first beacon. The initiating device (12) minimizes the length of time in which it must wait to receive the target device beacon by timing a corresponding target beacon receive period based on stored data such as information based on previous communication with the target device (14).

20 Claims, 4 Drawing Sheets

*FIG. 6A*
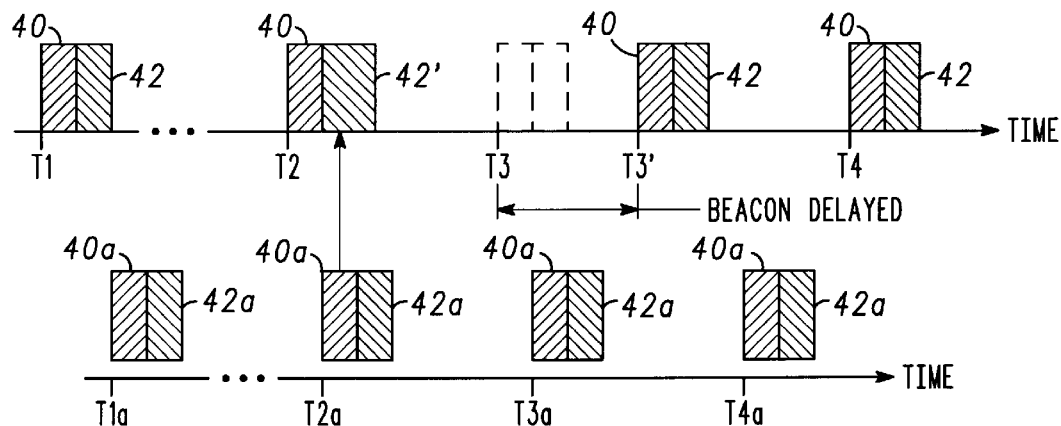
*FIG. 6B*
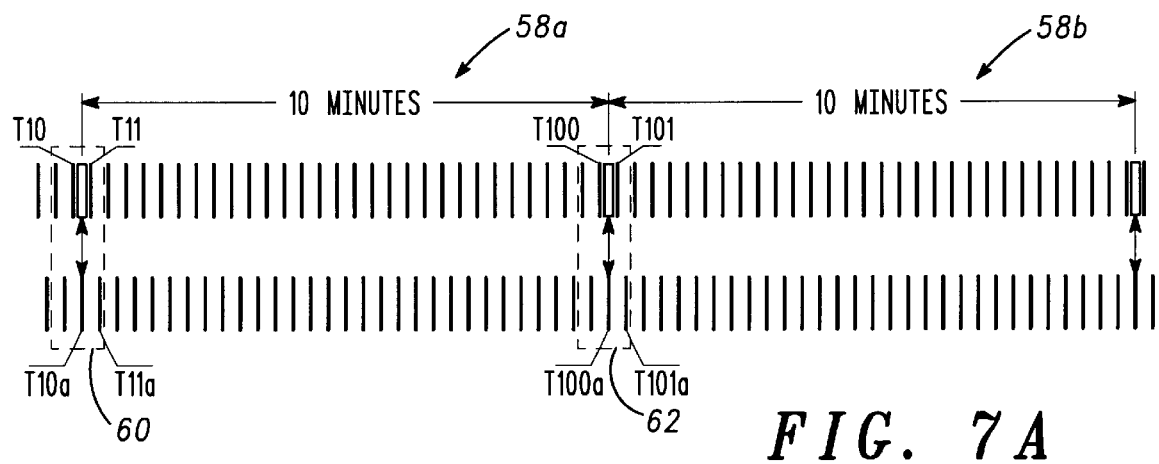
*FIG. 7A*
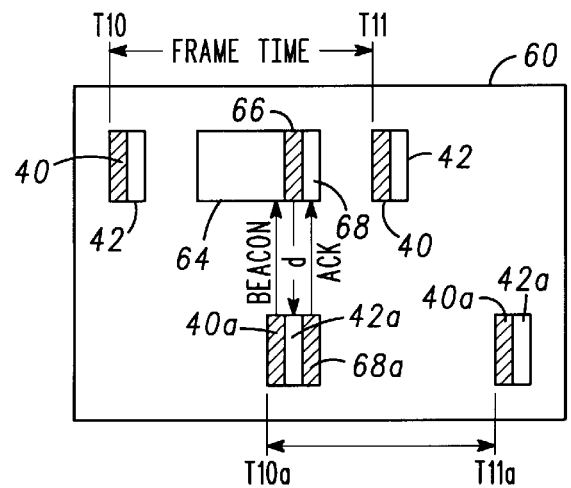
*FIG. 7B*

BEACON ASSISTED HYBRID ASYNCHRONOUS WIRELESS COMMUNICATIONS PROTOCOL

BACKGROUND OF THE INVENTION

1. Field of the Invention

The present invention relates generally to wireless communications protocol, and specifically to a hybrid asynchronous protocol that enables wireless devices to efficiently communicate with one another yet still remain in sleep mode a high percentage of the time.

2. Description of Related Art

Conventional wireless networks utilize a synchronous communications protocol that enables network devices to sleep a majority of the time and therefore operate with low power requirements. Network devices are able to sleep a majority of the time because they need only periodically wake up to transmit and receive messages to and from other network devices through a network base station and to synch with a network clock located at the base station. However, the network design of a system utilizing synchronous communications protocol requires infrastructure that is expensive and complex.

Wireless networks that utilize an asynchronous communications protocol provide an alternative to the above conventional synchronous wireless networks. Such networks are configured to enable network devices to communicate directly with one another through, for example, an ad hoc network. Because the network devices communicate directly with one another, the devices need not synch with a central base station clock.

As the need for a central base station is thereby eliminated in a network utilizing an asynchronous communications protocol, the hardware requirements necessary to implement such a network are reduced. However, because the network devices do not synch with a central base station clock, the devices must remain awake most or all of the time to listen for communications from other network devices. Consequently, network device power consumption is increased and battery life is decreased relative to networks utilizing a synchronous communications protocol.

BRIEF DESCRIPTION OF THE DRAWINGS

Objects and advantages of the present invention will be more readily apparent from the following detailed description of preferred embodiments thereof when taken together with the accompanying drawings in which:

FIGS. 6A and 6B are timing diagrams of neighboring wireless network devices illustrating how the beacon assisted hybrid asynchronous protocol according to a preferred embodiment of the present invention compensates for clock drift in the neighboring wireless network devices;

FIGS. 7A–7C are timing diagrams illustrating the transmit and receive time periods and corresponding beacon and message transmissions of wireless network devices during a data packet message mode of operation using the beacon assisted hybrid asynchronous protocol according to a preferred embodiment of the present invention;

DETAILED DESCRIPTION OF THE PREFERRED EMBODIMENTS

Figure 1:
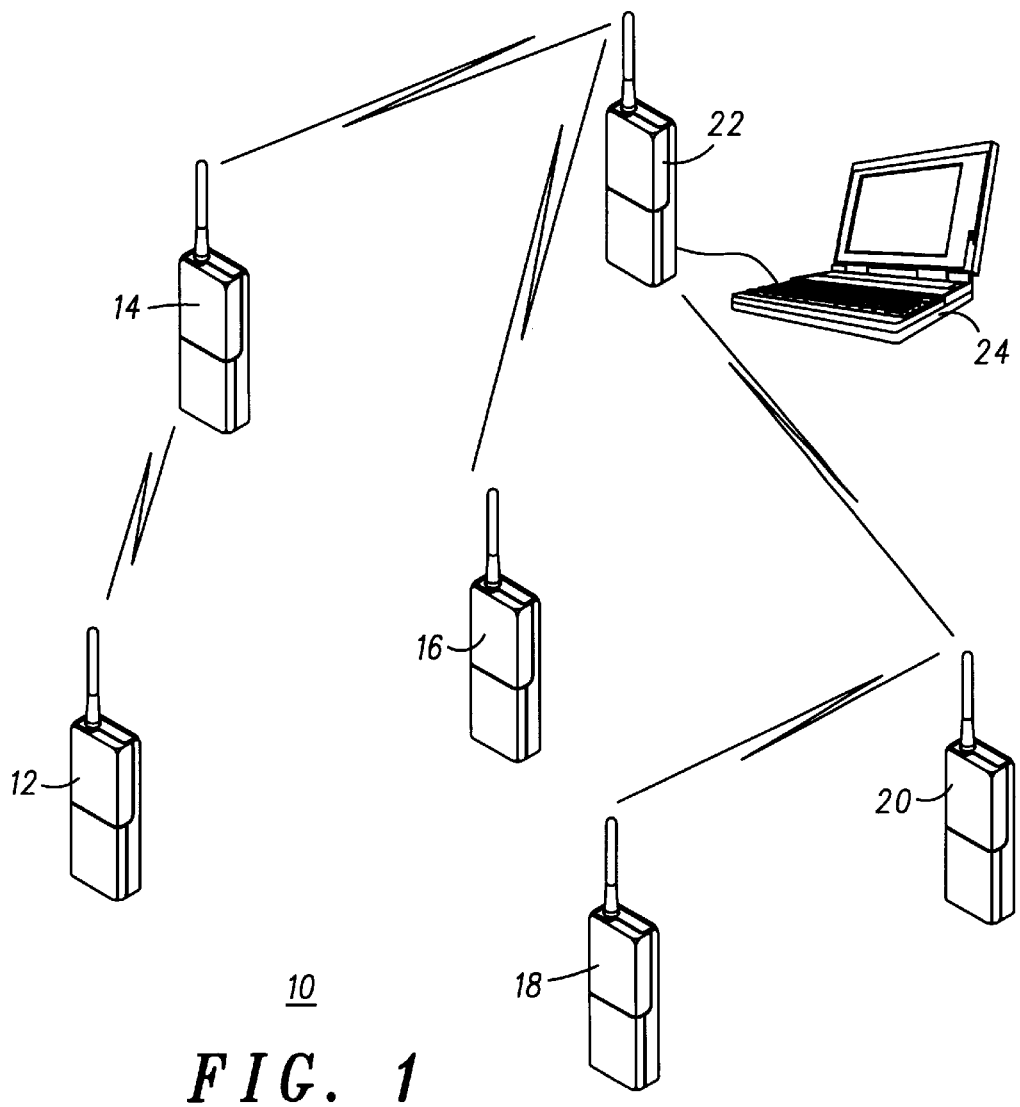
FIG. 1 is a network diagram of a wireless communications network in which wireless network devices are capable of communicating with one another by using the beacon assisted hybrid asynchronous protocol according to a preferred embodiment of the present invention.

In overview form the present disclosure concerns communications systems or networks that provide service to wireless network devices or communications units or more specifically user thereof operating therein. More particularly various inventive concepts and principles embodied in methods and apparatus for improving service availability in a communications system or network are discussed. The communications systems of particular interest are conventional cellular or cellular like wide area systems or networks and those being deployed and developed, commonly referred to as ad-hoc or mesh networks, that operate in an ad-hoc manner to form links amongst peers and thus collectively a local area network. More specifically we disclose an inventive approach or methodology and apparatus whereby the unique characteristics of each form of system are advantageously deployed or utilized to provide improved coverage for devices within the resultant systems.

As further discussed below various inventive principles and combinations thereof are advantageously employed that use the wide area or local area systems as appropriate to provide or expand and augment coverage for the respective devices. This will alleviate various problems associated with known systems while still facilitating setting up and maintaining sessions or links with a device or between devices or groups of devices or users provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore further discussion of such software, if any, will be limited in the interest of brevity and minimization of any risk of obscuring the principles and concepts in accordance with the present invention.

Referring now to the drawings in which like numerals reference like parts, FIG. 1 shows an exemplary wireless communications network 10 in which the beacon assisted hybrid asynchronous protocol according to a preferred embodiment of the present invention is implemented. The wireless communications network 10 includes several member wireless network devices, referred to hereinafter as network devices, 12–22 that are capable of communicating with one another. The network devices 12, 16, 18 transmit data that they have respectively collected to the network device 22 that, in the present embodiment, is a central access point and is connected to a processing engine 24 that analyzes the collected data. The connection to the processing engine 24 can be short or long range, and can be either wired or wireless in nature. Examples of such a connection include an Ethernet, WLAN or an RS232 connection.

The network devices 14, 20 act as ad hoc or peer-to-peer relay devices for forwarding the data collected by and transmitted from the network devices 12, 18, respectively, as well as data collected at the network devices 20, 22, to the processing engine 24 through the network device 18. Alternatively, not all of the network devices 12–22 may collect data depending upon the specific configuration of the wireless communications network 10. This ad hoc or peer-to-peer aspect of the present invention enables the network devices 12–22 to communicate within the wireless communication network 10 without the need for a base station. Therefore, the cost and complexity associated with such a base station is eliminated.

While the wireless communications network 10 has been shown with a specific hardware configuration, it should be appreciated that network hardware configurations will vary depending upon specific end user needs and requirements. As a result, more or fewer network devices may be included to transmit collected data to one or more processing engines.

Figure 2:
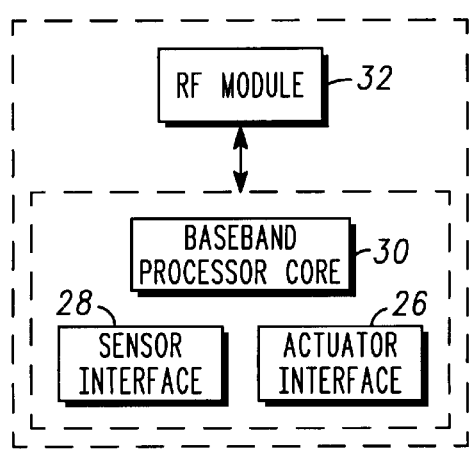
FIG. 2 is a block diagram of the hardware required to implement one of the wireless network devices shown in FIG. 1.

FIG. 2 illustrates the hardware components of a network device such as, for example, the network device 12. Specifically, the network device 12 include an actuator interface 26 to actuate, for example, an air vent controller and a sensor interface 28 for sensing, for example, air temperature at or near the air vent controller in an HVAC-specific application. However, the above components and application are only exemplary in nature, as specific components will vary depending on the specific application. A base band processing core 30 is for generating instructions for the actuator interface 26 sensor interface 28 and RF module 32. The RF module 32 includes a receiver (not shown) with an A/D converter (not shown) for converting RF signals received from others of the network devices 14–22 for input into the base band processing core 30 so that the base band processing core 30 can, if necessary, generate instructions for the actuator interface 26 that are responsive to the received RF signals. The RF module 32 also includes a transmitter (not shown) with a D/A converter (not shown) and is for transmitting RF signals to the network devices 14–22 based on instructions received from the base band processing core 30.

Figure 3:
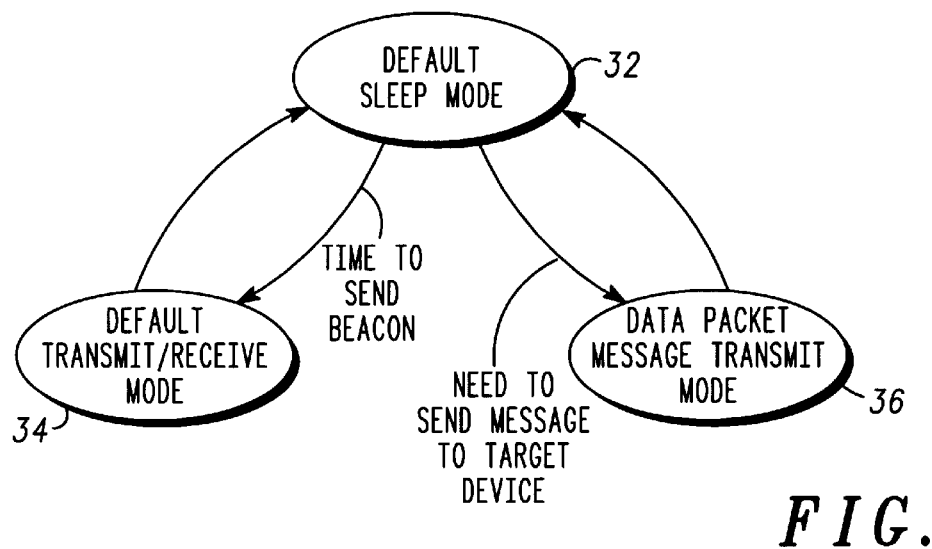
FIG. 3 is a state diagram showing the modes of operation of a wireless network device within the wireless coverage area shown in FIG. 1 and based on the beacon assisted hybrid asynchronous protocol according to a preferred embodiment of the present invention.

FIG. 3 shows the operational characteristics of each of the network devices 12–22 as defined by the beacon assisted hybrid asynchronous protocol according to a preferred embodiment of the present invention. Although the operation of the network device 12 will be referred to hereinafter for purposes of discussion, it should be appreciated that the operation of the other network devices is essentially identical to that of the network device 12 unless otherwise indicated.

As shown, the network device 12 will always remain in a default sleep mode at 32 except to periodically wake up to operate in one of two modes: a default transmit/receive mode indicated at 34; or a data packet message mode indicated at 36. More specifically, the network device 12 will automatically wake up to operate in the default transmit/receive mode at 34 and will transmit its beacon to, and subsequently listen for and possibly receive, beacons or data packet messages from, the other network devices 14–22. Each of the beacons includes basic network device identification information and tells receiving, or target, network devices that the transmitting, or initiating, network device is going into a receive mode. If, however, the base band processing core 30 determines that the network device 12 needs to transmit a data packet message that includes short burst information such as, for example, temperature sensor or security node information, the network device 12 will wake up and go into the data packet message mode 36 rather than the default transmit/receive mode 34. As a result, the initiating network device 12 is able to communicate directly with the other network devices 14–22 in a power efficient manner.

Figure 4:
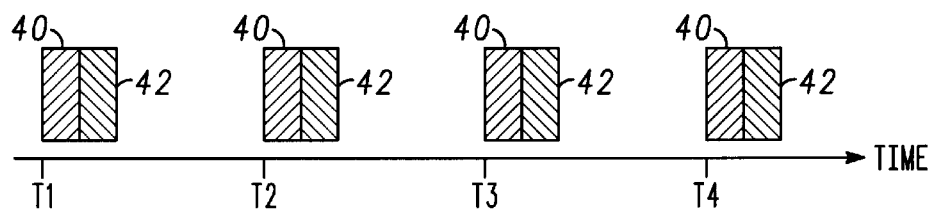
FIG. 4 is a timing diagram illustrating the transmit and receive periods of a wireless network device during a default transmit/receive mode of operation in accordance with the beacon assisted hybrid asynchronous protocol according to a preferred embodiment of the present invention.

Referring now to FIGS. 4–9, operation of the network device 12 in both the default transmit/receive and the data packet message modes of operation will now be discussed in greater detail. FIG. 4 shows sequential default transmit/receive periods of the network device 12 at 40, 42. The network device 12 wakes up from its default sleep mode at the beginning of each frame T1–T4 to operate in the default transmit/receive mode. Subsequent to termination of the receive periods 42, it reverts back to the default sleep mode for the remainder of each frame. Alternatively, the network device may wake up and enter the default transmit/receive mode based on a predefined pseudorandom wake-up sequence.

Figure 5:
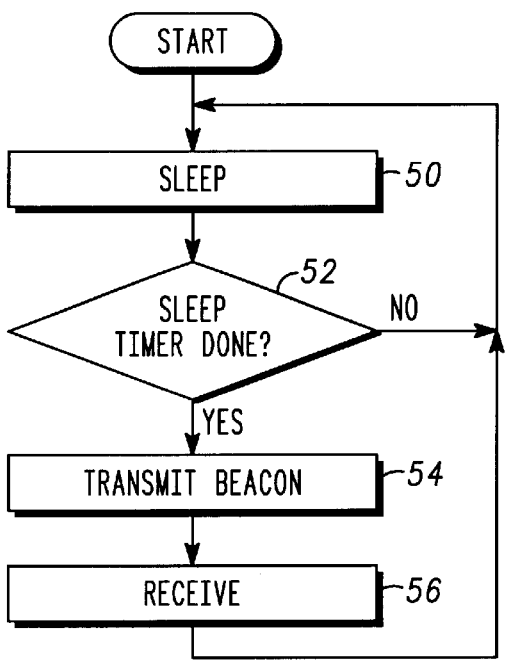
FIG. 5 is a flow diagram of the default transmit/receive mode of operation in accordance with the beacon assisted hybrid asynchronous protocol according to a preferred embodiment of the present invention as shown in FIG. 4.

FIG. 5 specifically illustrates the methodology of the initiating network device 12 in the default transmit/receive mode of operation as discussed above. At 50, the network device 12 remains in its default sleep mode until at 52 it determines that a sleep timer controlled by a processor clock (not shown) in the base band processing core 30 expires. Once the sleep timer expires, the network device 12 transmits its beacon at 54 during a beacon transmit period 40 as shown in FIG. 4. Subsequently, at 56 the network device 12 goes into a receive period 42 as shown in FIG. 4. During this time, it is capable of receiving either a beacon or a short burst data packet message as discussed above from another of the network devices 14, 22. Once the receive period expires, the network device 12 reverts to the default sleep mode until the sleep timer again expires.

It should be noted at this point that the beacon assisted hybrid asynchronous protocol according to a preferred embodiment of the present invention assumes that the network devices 12–22 are asynchronous with one another. Therefore, the clocks in each of the device base band processing cores will drift relative to one another. As a result, the beacon signals transmitted from the network devices 12–22 could eventually drift into one another and cause communications problems in the wireless communications network 10.

An example of beacon signals drifting onto one another is shown in FIGS. 6A–6B. Specifically, exemplary beacon transmit periods 40 and receive periods 42 are shown for the network device 12 in FIG. 6A, while in FIG. 6B exemplary beacon transmit periods 40a and receive periods 42a are shown for a neighboring network device, such as, for example, the target network device 14. As indicated by the extended receive period 42' of the frame period T2 in FIG. 6A, the initiating network device 12 can be programmed so that its receive period 42 remains open long enough to enable the network device 12 to receive and decode a data packet preamble and frame synch to determine the type of data packet it is receiving. If the received data packet is a beacon from the target network device 14 transmitted during a beacon transmit period T2a, the network device 12 will find a new time slot for its beacon transmit period 40 by time-shifting the frame T3 to frame T3'. The network device 12 can determine that a time shift is necessary in any number of ways, including using default transmit/receive period tables of neighboring network devices and the corresponding estimates of the respective beacon timings, or by shifting its beacon transmit period 40 by a predetermined number of beacon transmit/receive periods pursuant to, for example, conventional slotted ALOHA protocol, to find a suitable frame space during which to transmit. Regardless of the time shift method used, the network device 12 will shift the timing of the beacon transmit period in a manner that adds as little delay as possible to minimize the amount of time that neighboring network devices have to remain awake for subsequent communications.

It is also contemplated that the above time shift method described above in connection with FIGS. 6A–6B may also be applicable to time shift the receive and transmit periods associated with the data packet message mode of operation that will now be discussed.

Figure 7C:
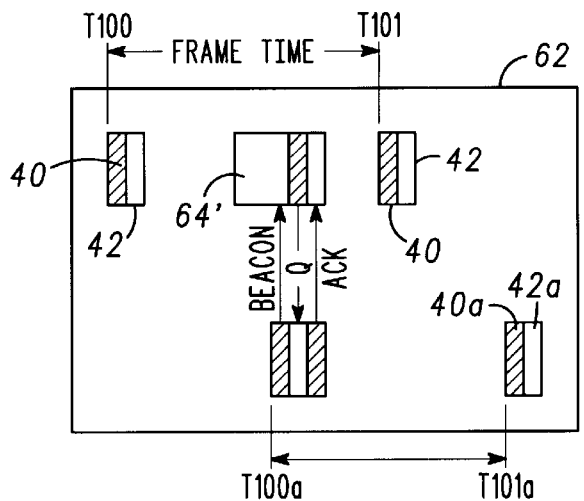

FIGS. 7A–7C illustrate the transmit and receive time periods and corresponding beacon and message transmissions of the exemplary wireless network devices 12, 14 during a data packet message mode of operation of the beacon assisted hybrid asynchronous protocol according to a preferred embodiment of the present invention. The network devices 12, 14 will be referred to as the initiating and target network devices 12, 14, respectively. As shown in FIG. 7A, both the initiating and target network devices 12, 14 wake up for respective beacon transmit and receive periods, shown generally at 58a, 58b, respectively, on a frame by frame basis, such as during exemplary frames T10, T11 and T10a, T11a, respectively. In FIG. 7B, which is an enlarged snapshot of the sequential frames T10, T11 of the initiating network device 12 and T10a, T11a of the target network device 14 as shown generally at 60 in FIG. 7A, the initiating network device 12 determines that it must transmit a short burst data packet message to the neighboring target network device 14 during the time frame T11. As a result, the initiating network device 12 wakes up during the frame T11, at a time when it would normally be asleep, to listen for a beacon transmitted during the frame T10a from the target network device 14. In this particular example, the initiating network device 12 has not communicated with the target network device 14 at all or for a long period of time. Therefore, the initiating network device 12 has no information about the timing of the beacon transmitted by the target network device 14 and therefore must wake up and turn on its receiver during an extended beacon receive period 64 until it receives the beacon from the target network device 14.

Once it receives the beacon from the target network device 14, the initiating network device 12 stores timing information associated with the beacon in a table in the base band processing core 30 for use in subsequent communications with the target network device 14, and sends a data packet message d to the target network device 14 immediately after the beacon receive period 40 ends during a data packet message transmit period 66, as the initiating network device 12 knows that the target network device 14 initiates a receive time period 42a after terminating the beacon transmit time period 40a. The initiating network device 12 then initiates an ACK receive time period 68 to listen for an ACK message from the target network device 14 indicating that the target network device 14 received the message d. Once the target network device 14 receives the data packet message d, it transmits the ACK message to the initiating network device 12 during an ACK message transmit period 68a. If the initiating network device 12 receives the ACK message, it returns to its previous default transmit/receive mode time slot. If the initiating network device 12 does not receive the ACK message, it enters into a random back-off mode and will attempt to communicate with the target network device 14 a predetermined number of times to try to confirm that the data packet message d was received. If it is unsuccessful in its attempts to communicate with the target network device 14, the initiating network device 12 will stop communication attempts and assume the connection has been lost.

As shown in FIG. 7C, which is an enlarged snapshot of subsequent sequential frames T100, T101 of the initiating network device 12 and T100a, T101a of the target network device 14 as shown generally at 62 in FIG. 7A when the initiating network device 12 wants to subsequently communicate with the target network device 14, the initiating network device 12 determines based on stored beacon timing information that it last heard the beacon from the network device ten minutes ago in the present example. As a result, the initiating network device 12 can reduce the amount of time it must allocate to a subsequent beacon receive period 64' in order to receive the beacon from the target network device 14. As a result, the initiating network device 12 can remain in the default sleep mode for a longer period of time and can therefore conserve more battery power than if it had to allocate a larger period of time for the beacon receive period 64' as it did for the beacon receive period 64 in FIG. 7B.

Regarding the above discussion, the initiating network device 12 should be more closely synchronized to the target network device 14 if the two network devices must frequently communicate. This synchronization may be achieved by using the frequency stability specification for the network devices (e.g. 100 ppm) and estimating a worst case drift scenario for the device processor clocks. Consequently, the initiating network device 12 could turn on its receiver earlier than the indicated worst-case drift scenario to minimize power consumption by the initiating network device 12.

Figure 8:
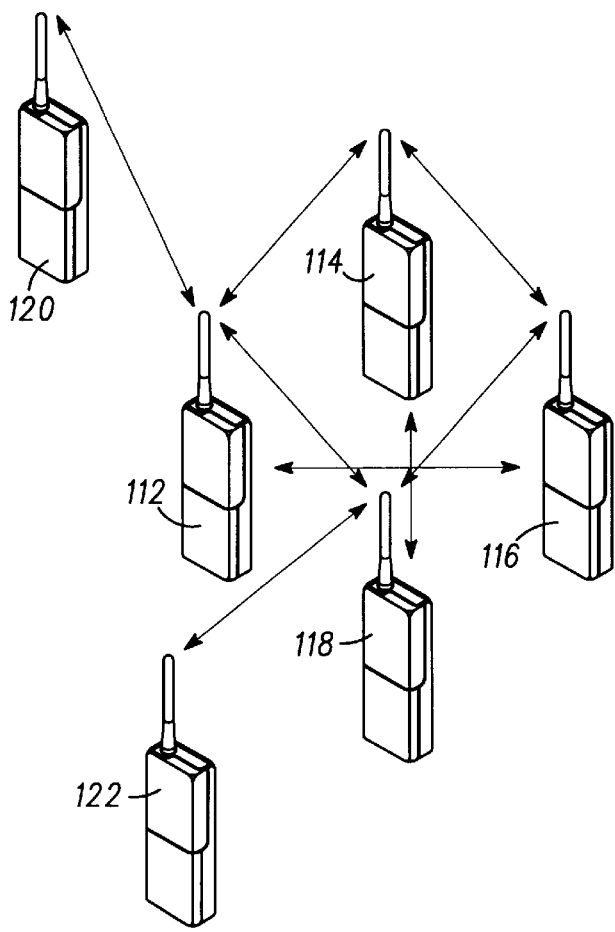
FIG. 8 is a network block diagram of a wireless coverage area in which wireless network devices are capable of communicating with one another by using a beacon assisted hybrid asynchronous protocol according to another preferred embodiment of the present invention.

In the above exemplary wireless communications network 10 in which the beacon assisted hybrid asynchronous protocol according to a preferred embodiment of the present invention is implemented, all of the network devices 12–22 are capable of operating both in the default transmit/receive and data packet message modes. However, as shown in FIG. 8, in the exemplary wireless communications network 100 in which the beacon assisted hybrid asynchronous protocol according to another preferred embodiment of the present invention is implemented, certain of the network devices, such as the network devices 112–118, may function in a manner identical to that of the earlier described network devices 12–22, while other network devices, such as the network devices 120, 122, may function as transmit only devices. Such transmit only devices may be more practical and less expensive to implement for applications in which data need only be transmitted but never received, including environmental monitoring. Sensors such as temperature or humidity are connected to the network devices 120, 122. These sensors need to report data to the network but in this case do not need data from the network.

Figure 9:
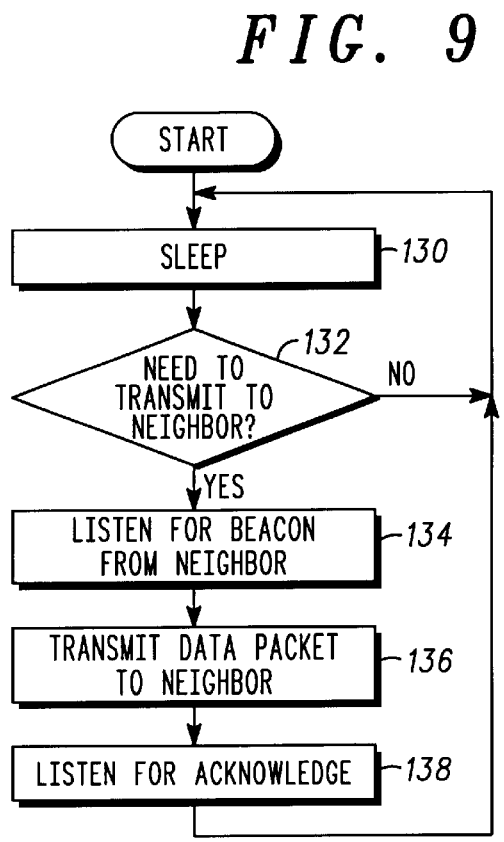
FIG. 9 is a flow diagram illustrating the beacon assisted hybrid asynchronous protocol implemented in the wireless coverage area shown in FIG. 8.

FIG. 9 illustrates the operation of the transmit only network devices 120, 122. However, the following description refers to the operation of only the transmit-only network device 120 for ease of discussion. At 130, the transmit-only network device 120 remains in a default sleep mode until at 132 it wakes up and determines that it must transmit a short burst message to a neighboring network device, such as the network device 112 shown in FIG. 8. At 134, it initiates a receive period during which it listens for the beacon transmitted from the network device 112. When the transmit-only network device 120 does receive the beacon, it transmits the data packet message to the network device 112 at 136. After it transmits the data packet message at 136, at 138 the transmit-only network device 120 then listens for an ACK message from the network device 112 and returns to its default sleep mode at 130 once it receives the ACK message. If it does not receive the ACK message from the network device 112 during the designated receive period, the transmit-only network device 120 will enter into a random back-off mode and will attempt to communicate with the target network device 14 a predetermined number of times to try to confirm that the data packet message was received as in the previously discussed embodiment. If it is unsuccessful in its attempts to communicate with the target network device 14, the initiating network device 12 will stop attempts, assume the connection has been lost and will subsequently try to connect with another network device.

While the above components are shown as being necessary to implement the present invention, it should be appreciated that the actual hardware configuration of network devices such as the network devices 12–22 and 112–122 may vary based on specific network parameters.

In addition, the beacon assisted hybrid asynchronous protocol according to preferred embodiments of the present invention may alternatively be implemented using transmit/receive time periods that are temporally spaced apart from one another if a particular application requires so.

Further, it is contemplated that the exemplary wireless communications networks 10, 100 in which the beacon assisted hybrid asynchronous protocol according to preferred embodiments of the present invention may be implemented in, for example, precision agriculture applications in which parameters such as soil moisture and humidity must be monitored, in HVAC system applications requiring air handler activation based on monitored parameters, in security monitoring systems, or in any other application requiring that remotely monitored data be periodically reported to a decision location.

While the above description is of the preferred embodiment of the present invention, it should be appreciated that the invention may be modified, altered, or varied without deviating from the scope and fair meaning of the following claims.

What is claimed is:

1. A method of asynchronously communicating with a target wireless device, comprising:
   occasionally entering a first wake up mode from a default sleep mode to transmit an initiating device beacon and to listen for target device transmissions;
   entering a second wake up mode if a data packet message must be transmitted to the target wireless device;
   during the second wake up mode:
      waiting to receive a target beacon directly from the target wireless device;
      transmitting the data packet message directly to the target wireless device after receiving the target device beacon directly from the target wireless device; and
   reverting to the default sleep mode upon termination of either the first or the second wake up mode.

2. The method of claim 1, further comprising listening for an acknowledgement message responsive to the data packet message and transmitted directly from the target wireless device.

3. The method of claim 2, further comprising reverting to the default sleep mode immediately after termination of the listening for an acknowledgement message responsive to the data packet message transmitted directly from the target wireless device and until a subsequent occurrence of one of the occasionally entering a first wake up mode from a default sleep mode to transmit a source beacon packet and the entering a second wake up mode if a data packet message must be transmitted to the target wireless device.

4. The method of claim 1, wherein the waiting to receive a target device beacon directly from a target wireless device further comprises adjusting a timing of a target device beacon receive period based on stored information to ensure receipt of the target device beacon.

5. The method of claim 4, wherein the adjusting of the timing of a target device beacon receive period based on stored information to ensure receipt of the target device beacon comprises adjusting the timing of a target device beacon receive period based on previous communication with the target wireless device.

6. The method of claim 5, further comprising adjusting respective timings of subsequent second wake up modes based on the previous communication with the target wireless device to minimize a time period during which the waiting to receive a target device beacon directly from the target wireless device occurs.

7. The method of claim 1, further comprising adjusting, based on device clock drift parameters, the occasionally entering a first wake up mode from a default sleep mode to transmit an initiating device beacon and to listen for a target device beacon.

8. The method of claim 1, wherein the transmitting of the data packet message directly to the target wireless device is executed in a temporally contiguous manner relative to the waiting to receive a target device beacon directly from the target wireless device.

9. The method of claim 1, further comprising reverting to the occasionally entering a first wake up mode from a default sleep mode to transmit an initiating device beacon after termination of the entering a second wake up mode rather than the first wake up mode if a data packet message must be transmitted to the target wireless device.

10. The method of claim 1, wherein the occasionally entering a first wake up mode from a default sleep mode to transmit an initiating device beacon and to listen for a received target device beacon is executed in one of a periodic and a pseudorandom manner.

11. A method of wireless communication, comprising:
- transmitting initiating arid target beacons from initiating and target devices, respectively, during respective initiating and target device transmit periods;
- listening for the initiating and target beacons at the target and initiating devices, respectively, during respective target and initiating device receive periods;
- if necessary, entering a data packet message period at the initiating device to enable the initiating device to receive the target beacon from the target device regardless of a timing of the target beacon;
  - at the initiating device, transmitting the data packet message to the target device after receiving the target beacon from the target device; and
- subsequently returning to a default sleep mode at the target device after either transmitting an acknowledgement message or upon expiration of the target device receive period, and at the initiating device after either receiving the acknowledgement message or upon expiration of the initiating device receive period.

12. The method of claim 11, further comprising, at the initiating device, listening for the acknowledgement message from the target device indicating that the target device received the data packet message.

13. The method of claim 11, further comprising, if necessary, adjusting the initiating device transmit period to compensate for processor drift at at least one of the target and initiating devices to avoid beacon interference.

14. The method of claim 13, wherein the, if necessary, adjusting the initiating device receive period at the initiating device to compensate for processor drift at at least one of the target and initiating devices to avoid beacon interference comprises, if necessary, delaying the initiating device transmit period, and consequently the initiating device receive period, by at least one initiating device transmit/receive period.

15. The method of claim 11, wherein the, if necessary, entering a data packet message period at the initiating device to enable the initiating device to receive the target beacon from the target device comprises, if necessary, maintaining the initiating device receive period at the initiating device until the initiating device receives the target beacon from the target device.

16. The method of claim 10, wherein the, if necessary, entering a data packet message period at the initiating device to enable the initiating device to receive the target beacon from the target device is periodically executed every predetermined number of frames.

17. A wireless communications network, comprising:
- an initiating device including a processor for periodically causing the initiating device to wake up from a default sleep mode to transmit an initiating device beacon and to subsequently receive a target device message during a default initiating device transmit/receive mode;
- the processor further for also causing the initiating device to enter a data packet message mode to enable the initiating device to listen for the target device message until the target device message is received, and to transmit a data packet message upon receipt of the target device message; and
- the processor for causing the initiating device to return to the default sleep mode subsequent to termination of either the default transmit/receive mode or the data packet message mode.

18. The wireless communications network of claim 17, further comprising, at the initiating device, listening for an acknowledgement message indicating receipt of the target device data packet message.

19. The wireless communications network of claim 17, wherein the processor is further for enabling the initiating device to directly and asynchronously communicate with target wireless devices.

20. The wireless communications network of claim 17, wherein the processor is further for alternatively causing the initiating device to enter the data packet message mode when the initiating device would otherwise be in the default sleep mode.

* * * * *

UNITED STATES PATENT AND TRADEMARK OFFICE
CERTIFICATE OF CORRECTION

PATENT NO. : 6,671,525 B2  
DATED : December 30, 2003  
INVENTOR(S) : Vernon Anthony Allen et al.

It is certified that error appears in the above-identified patent and that said Letters Patent is hereby corrected as shown below:

<u>Column 9,</u>  
Line 5, after "initiating" delete the word "arid" and insert the word -- and --

Signed and Sealed this

Twentieth Day of April, 2004

JON W. DUDAS  
*Acting Director of the United States Patent and Trademark Office*